(12) United States Patent
Kulathu et al.

(10) Patent No.: US 9,450,407 B2
(45) Date of Patent: Sep. 20, 2016

(54) METHOD AND SYSTEM FOR POWER MANAGEMENT IN SUBSTATIONS

(75) Inventors: Ganesh Kulathu, Bangalore (IN);
Arinjai Gupta, Bangalore (IN);
Emilian-Ioan Anton, Oslo (NO)

(73) Assignee: ABB Schweiz AG, Baden (CH)

( * ) Notice: Subject to any disclaimer, the term of this patent is extended or adjusted under 35 U.S.C. 154(b) by 727 days.

(21) Appl. No.: 13/542,469

(22) Filed: Jul. 5, 2012

(65) Prior Publication Data
US 2013/0035800 A1    Feb. 7, 2013

Related U.S. Application Data

(63) Continuation of application No. PCT/IB2011/000004, filed on Jan. 4, 2011.

(30) Foreign Application Priority Data

May 7, 2010    (IN) ............................. 1275/CHE/2010

(51) Int. Cl.
| | |
|---|---|
| *G06F 1/26* | (2006.01) |
| *H02J 3/14* | (2006.01) |
| *H02H 3/033* | (2006.01) |
| *H02H 3/05* | (2006.01) |
| *H02H 7/26* | (2006.01) |
| *H02J 13/00* | (2006.01) |

(52) U.S. Cl.
CPC ................. *H02J 3/14* (2013.01); *H02H 3/033* (2013.01); *H02H 3/05* (2013.01); *H02H 7/261* (2013.01); *H02J 13/0062* (2013.01); *H02J 13/0079* (2013.01); *Y02B 70/3225* (2013.01); *Y02E 60/724* (2013.01); *Y04S 10/18* (2013.01); *Y04S 20/222* (2013.01)

(58) Field of Classification Search
None
See application file for complete search history.

(56) References Cited

U.S. PATENT DOCUMENTS

| | | | |
|---|---|---|---|
| 5,191,520 A | 3/1993 | Eckersley | |
| 6,694,271 B1 * | 2/2004 | Hannon | ........................... 702/58 |
| 7,373,222 B1 * | 5/2008 | Wright et al. | ................. 700/295 |
| 2003/0187550 A1 | 10/2003 | Wilson et al. | |
| 2006/0064205 A1 | 3/2006 | Ying | |
| 2010/0013632 A1 * | 1/2010 | Salewske et al. | ............. 340/540 |
| 2010/0152914 A1 | 6/2010 | Ying | |
| 2015/0002186 A1 * | 1/2015 | Taft | ........................... 324/764.01 |

OTHER PUBLICATIONS

International Search Report (PCT/ISA/210) issued on Dec. 13, 2011, by the European Patent Office as the International Searching Authority for International Application No. PCT/IB2011/000004.

* cited by examiner

*Primary Examiner* — Sean Shechtman
(74) *Attorney, Agent, or Firm* — Barnes & Thornburg LLP

(57) ABSTRACT

Power management systems and methods are disclosed for a plant electrical network using plurality of controllers configured for power management such that a first controller from the plurality of controllers is configured to perform power management in a first local process area within the plant electrical network and can communicate with a second controller that is configured for power management in a second local process area within the plant electrical network, over a plant wide communication network. The power management function in the first local process area can be performed based on the information communicated between the first controller and the second controller and/or based on a power balance computation carried out for the plant wide electrical network or for the first local process area. The power management function can include slow load shedding.

15 Claims, 6 Drawing Sheets

METHOD AND SYSTEM FOR POWER MANAGEMENT IN SUBSTATIONS

RELATED APPLICATIONS

This application claims priority as a continuation application under 35 U.S.C. §120 to PCT/JP2011/000004, which was filed as an International Application on Jan. 4, 2011 designating the U.S., and which claims priority to PCT Application No. PCT/IB2010/000001 filed as an International Application on Jan. 5, 2010 and an Indian Application 1275/CHE/2010 filed in India on May 7, 2010. The entire contents of these applications are hereby incorporated by reference in their entireties.

FIELD

The present disclosure relates generally to the field of power management systems, such as power management in substations of process industries.

BACKGROUND

An electrical or power substation can involve electricity transmission and distribution systems where voltage is transformed from high to low or the reverse using transformers. Electric power may flow through several substations between a generating plant and a consumer or load, and the voltage may be transformed in several steps.

Industrial setups can involve intense energy consumption and include one or multiple dedicated substations including both an upstream substation connecting to the main source of power (either the grid or the in-house generator) and downstream substations for distribution of power to different load centers distributed over various parts of industries. In addition, the industry may have its own generation system to meet its energy demand and also have power management system for effectively handling power for its purpose.

Power management functionality includes load shedding, power and voltage control, power restoration, power source synchronization, etc. that depend on measurements like voltage, current, power and other power-quality parameters for effective handling of power demands for various equipment and processes, power fluctuations, equipment constraints, etc. It is known to find these kinds of power management functions within industrial setups like process industries such as refineries and power utilities. However, such a setup is also applicable to other process industries such as cement, pulp and paper, petrochemical plants, fertilizers, steel, mining and metals, water and waste water treatment plants, etc.

The substations (both upstream and downstream) can include several power and distribution transformers, cabling, switching, reactive power and grounding equipment. This equipment should be protected against power system anomalies like power surges, power system faults, etc. Such protection can be accomplished by Intelligent Electronic Devices (IEDs) that provide different comprehensive protection and monitoring functions. Besides protection and monitoring functions, IEDs can also offer metering and control functions. The IEDs are microprocessor-based devices that are associated with power system equipment, such as circuit breakers, generators, transformers, power lines, power cables, reactors, motors, capacitor banks, etc. IEDs can receive primary power system information like voltage and current from sensors to perform various protection and monitoring functions. Known types of IEDs include protective relaying devices, load tap changer controllers, circuit breaker controllers, recloser controllers, voltage regulators, secondary functions like load shedding, etc. where the load shedding functionality is implemented in an IED and process data exchange for such a functionality is done by the primary IEDs that directly interface with the power system equipment, controllers, etc. Thus, an IED can perform several power system functions depending on its purpose.

Substation automation can be an important and complex aspect to solve power system function tasks, using state of the art technologies. By doing so, Substation automation can provide value added features to perform automatic control based on power system conditions/events, equipment maintenance, communication of substation information to higher level control systems like Grid Control Centers, etc. Through the Substation automation, manual and automatic control command functions are provided such as closing and opening of switching equipment (circuit breakers and disconnectors), or raising/lowering voltage levels in order to maintain desired voltage levels. Multiple communication protocols exist for substation automation, which include many proprietary protocols with custom communication links. However, interoperation of devices from different vendors is highly desired for simplicity in implementation and use of substation automation devices.

The IEC61850 standard from the International Electrotechnical Commission (IEC) advocates interoperability amongst Intelligent Electronic Devices (IEDs) from various manufacturers using known engineering models (for example, IEC61850 Common Engineering Model using Logical Nodes), data formats and communication protocols. Recent IEDs are therefore designed to support the IEC61850 standard for substation automation, which provides interoperability and advanced communications capabilities like GOOSE (Generic Object Oriented Substation Event) and MMS (Manufacturing Message System) communication profiles.

The power management functionality like load shedding is currently implemented as a centralized function in the substation automation systems for process industries like refineries, petrochemical plants, steel plants, cement, pulp and papers, etc. The load shedding or shedding of load referred herein generally implies cutting off the power on certain lines/loads, when the power demand becomes greater than the power supply. This can happen on the occurrence of a power system fault or an event that would affect the power available to feed the processes in an electrical network.

Centralized implementation of the above function, such as when implemented in a single process controller IED and deployed at the upstream substation, can have several short comings. For example, centralized function implementation can cause high loading due to centralization of all functions for the complete power system network, where load shedding is to be deployed. It also can result in high and sustained levels of communication loads in the process controller IED, as it would collect desired data from downstream IEDs for execution of the centralized function. This can lead to lower availability of the process controller IED for other activities. Since the downstream IEDs are directly connected to the central process controller, it is directly exposed to the complexity of the substation configurations and connectivity.

Further, overload situations in power equipment, such as a downstream transformer, cannot be easily detected in the centralized implementation and hence there may be no facility for downstream substation slow load shedding to lessen overloading on the power equipment. Slow Load Shedding may be based on overload of grid (public grid) transformer(s) or interconnecting transformer(s) to a substation. Contemporary power management solutions encompass a grid transformer overload load shedding functionality and there is no overload handling for interconnecting transformers between upstream and downstream substations. In an event of the grid transformer being overloaded, the central process controller sheds loads to correct the overload condition and in the event of interconnecting transformers being overloaded, the overload protection may get activated and isolate the transformer resulting in lower availability of the interconnecting transformer.

Exemplary embodiments disclosed herein are directed to developing a power management system and technique that can allow for improved power management by managing overloading of power equipment such as, interconnecting transformer(s), and effective slow load shedding in the system to provide higher system availability.

SUMMARY

A method for power management is disclosed for a plant electrical network using one or more local controllers and a central controller, the one or more local controllers and central controller being configured for power management in respective local process areas, the method comprising: receiving, at a central controller, load condition information which includes an amount of overload in power equipment, and a direction of the overload, from at least one local controller in the plant electrical network or directly from an intelligent electronic device associated with the power equipment; performing power balance computations, by the central controller, for plant wide power management; issuing a power management command, by the central controller, based on the direction of the overload; and carrying out load shedding by the central controller in a respective local process area based on a power balance computation or on having the at least one local controller carry out load shedding in the respective local process area based on the power management command issued.

A method for slow load shedding is disclosed for a plant electrical network having a plurality of controllers, connected through a plant wide communication network, configured for power management in respective local process areas in the plant electrical network, and having a controller among the plurality of controllers configured as a central controller for plant wide power management functionality, the method comprising: detecting, by a first controller, an overload condition in a power equipment in a first local process area, and consolidating overload condition information; assessing, by the first controller, an ability to communicate overload condition information to at least one other controller among the plurality of controllers, and/or electrical connectivity for the first local process area, to select an operation and control mode; performing, by the first controller, based on the operation and control mode, a power balance computation to determine priority information for load shedding to control loading of the power equipment in the first local process area using the overload condition information, or causing at least one local controller from the plurality of controllers in the plant electrical network to receive priority information for load shedding to control loading of the power equipment in the first local process area based on consolidated overload condition information communicated to the central controller; and performing, by the first controller and/or by the at least one other controller among the plurality of controllers in the plant electrical network, load shedding based on the priority information for load shedding to control load in overloaded power equipment.

A controller is disclosed, comprising: means configured for power management in a first local process area within a plant electrical network; and means for communicating, over a plant communication network, with one other controller configured for power management in the plant electrical network in a second local process area, wherein the power management function is a load shedding function in the plant electrical network to control loading of at least one power equipment in the plant electrical network.

A power management system is disclosed for a plant electrical network including power distribution equipment, power actuators and loads of an industrial plant, the system comprising: a plant-wide communication network; and a plurality of controllers for power management in the plant electrical network, wherein a first controller from the plurality of controllers is configured for power management in a first local process area within the plant electrical network and is capable to communicate, over the communication network, with at least a second controller from the plurality of controllers configured for power management in a second local process area within the plant electrical network, and for performing a power management function based on information communicated between the first controller and the second controller and/or based on a power balance computation carried out for a plant wide electrical network or for the first local process area.

BRIEF DESCRIPTION OF THE DRAWINGS

These and other features, aspects, and advantages of the present disclosure will become better understood when the following detailed description is read with reference to the accompanying drawings, wherein.

DETAILED DESCRIPTION

Figure 1:
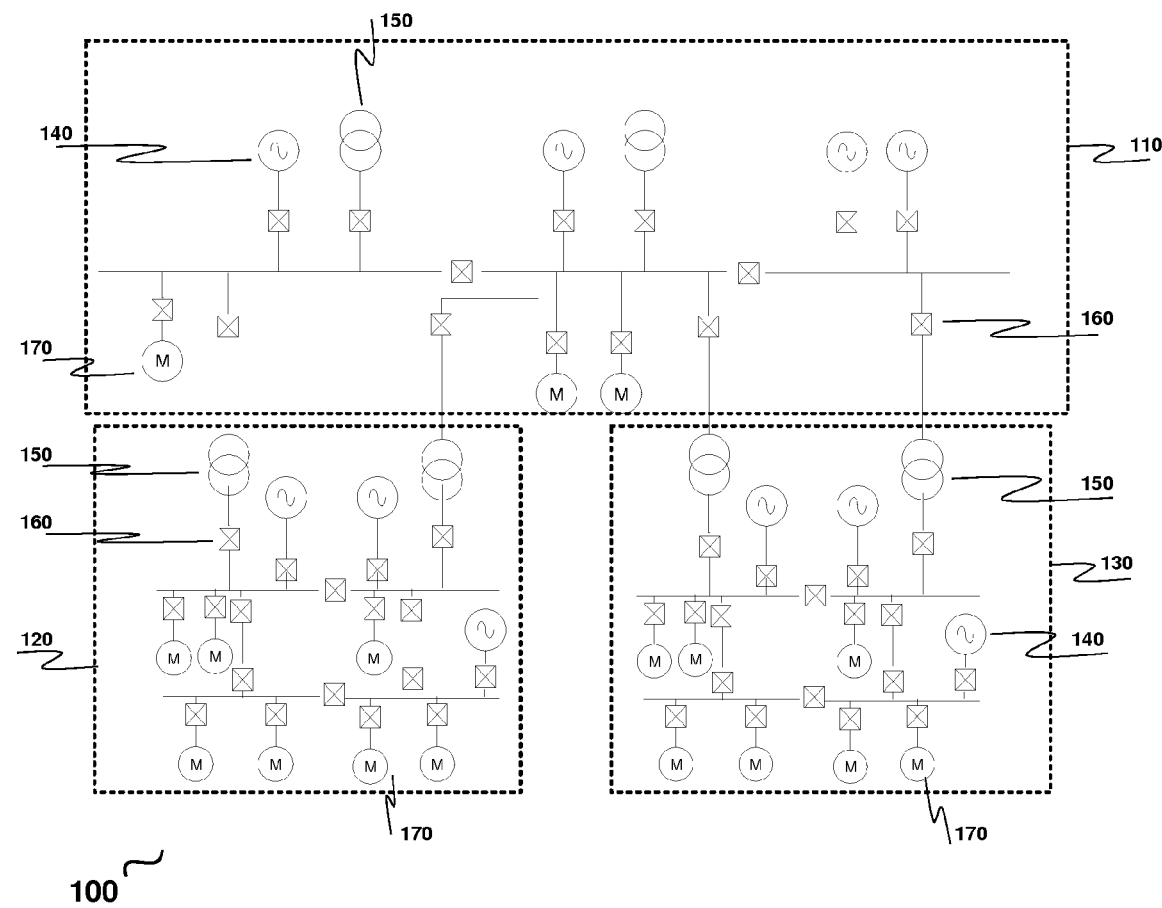
FIG. 1 is an exemplary electrical Single Line Diagram depicting different process areas associated with respective substations.

A power management system is disclosed for a plant electrical network. The power management function can include slow load shedding for transformers in the plant electrical network using a plurality of controllers for power management in the plant electrical network, connected in a plant-wide communication network. The controllers can be configured to perform power management in their respective local process areas and operate in a remote control mode involving communication and information exchange with at least one other controller, or operate in a completely autonomous mode wherein the controller can carry out power balance computation and estimation of load shed priority information or in partially autonomous mode carrying out power management functions both to operate in a remote control mode and in a complete autonomous mode. The operation mode depends on the assessment of an ability to communicate (e.g., instances such as communication failure due to a network issue or unavailability or failure of other devices/controllers) and electrical connectivity (e.g., islands are electrically isolated with the rest of the electrical networks in the plant wide electrical networks).

The scope of the local process area depends on the configuration of the controller as a central controller, having an entire plant as a scope for the local process area and, in addition, is capable of performing power management in a local process area exclusively managed by the central controller. Such exclusive configuration of local process areas can be preformed for the controllers configured as local controllers.

An exemplary method is also disclosed for power management in a plant electrical network using one or more local controllers and a central controller. The method can comprise the central controller receiving load condition information comprising of amount of overload in power equipment and the direction of the overload from at least one local controller in the plant electrical network or directly from an intelligent electronic device associated with the power equipment; the central controller performing power balance computations for the plant wide power management; the central controller issuing a power management command based on the direction of the overload; and the central controller directly carrying out load shedding in a respective local process area based on the power balance computation or having the one or more local controllers carry out load shedding in their respective local process area based on the power management command issued.

The power management command can include load shedding commands (slow load shedding or fast load shedding or manual load shedding) along with load shed priority information. The command can also include indications of the type of load shed and may include information regarding time within which the load has to be shed in case of slow/manual load shedding. Various types of load shed may be performed concurrently to ensure effective power management in the plant electrical network.

In another exemplary embodiment, a method is disclosed for slow load shedding in a plant electrical network having a plurality of controllers. The method can include a first controller detecting the overload condition in a power equipment in a first local process area and consolidating overload condition information; the first controller assessing ability to communicate overload condition information to at least one other controller from the plurality of controllers and/or electrical connectivity for the first local process area to select (e.g., decide) an operation and control mode; the first controller, based on the decided operation and control mode, performing a power balance computation to determine priority information for load shedding to control loading of the power equipment in the first local process area using the overload condition information, or causing at least one local controller from the plurality of controllers in the plant electrical network to receive priority information for load shedding to control loading of the power equipment in the first local process area based on the consolidated overload condition information communicated to the central controller; and the first controller and/or the at least one other controller from the plurality of controllers in the plant electrical network performing load shedding based on the priority information for load shedding to control load in the overloaded power equipment.

According to yet another aspect, a controller (e.g., device) is provided. The controller is configured for power management in a local process area within the plant electrical network and capable of communicating, over a plant communication network, with another controller (e.g., device) configured for power management in their respective local process area. The controller is configured to perform a load shedding function in the plant electrical network to control loading of at least one power equipment in the plant electrical network. The type of load shedding may be slow load shedding or fast load shedding or manual load shedding operated concurrently or individually.

The systems and techniques described herein can provide unique power management solutions. Load shedding has been described herein as an exemplary power management functionality, however the same concept can be extended to other functions such as power control, load restoration, sequential starting, etc. in industrial set-ups. Similarly, a process industry has been described herein as a non-limiting example of where such power management solutions can be applied.

Systems and techniques described herein include providing additional process controllers, the Local Controllers, for local power management as desired to function in hierarchical manner with a process controller designated for overall plant level power management. The designated process controller for overall plant level power management is referred to herein as a Central Controller. Further, the systems and techniques described herein are applicable in a distributed power management environment where there is no designated Central Controller as such, the power management is done at local levels by Local Controllers and they communicate with each other for any needed power balance situations. The technique is based on Open Communication Standards (OCS) like IEC61850-MMS and IEC61850-GOOSE.

With reference to load shedding, overall plant load shedding is associated with a plant electrical network that could include of one or multiple upstream and downstream substations that are geographically concentrated or distributed. In other words, the plant level load shedding functionality as referred herein relates to load shedding in the substations handled through direct control of a Central Controller and through appropriate coordination with one or more additional process controllers (Local Controllers) for local load shedding in substations. The plant electrical network can also include power distribution equipment (e.g. transformers, circuit breakers, etc.), power actuators (e.g. drives for breaking operation in circuit breaker, etc.), and substation automation products (e.g. process controller, IED, network communication accessories, etc.). The power actuators for power management application may operate to shed or connect loads as well as local generators.

The local load shedding as referenced herein is load shedding in a local process area. For example, the loads are shed in downstream substation(s) under a process plant. The local process area as referenced herein can include power sources (transformer connection to grid or upstream substations or other energized networks), local generation systems and local loads, and the loads are shed or connected in the local process area under control of the power management device or controller. Further, a local process area may be associated with, for example, a part of a substation (in case of a large substation) or completely with one substation (medium size substation) or multiple substations (small size substation).

Local loads may include different process equipment such as variable speed drives for industrial motors, compressors, pumps, furnaces, etc. The energization/de-energization of these loads can be controlled by IEDs through circuit breakers.

A local island network as described herein can be defined as a part of plant electrical network and may exist as a local as a process area that is electrically isolated from the rest of the power electrical network and therefore does not contribute in a power balance of the overall process plant.

The power balance and power balance principles as described herein refer to, for example, balancing of supply from generators and transformers (e.g., connected to an upstream substations/grid side) and demand from the load side of power in the process plant. The power balance calculations as used herein below refer, for example, to known calculations for electrical networks and components to achieve the power balance.

Now turning to drawings, FIG. 1 is an electrical Single Line Diagram 100 depicting three local process areas in an exemplary plant electrical network. One of the local process areas, for example a first local process area 110, is associated with an upstream substation and the other two local process areas, (a second local process area 120, and a third local process area 130) are associated with downstream substations. This exemplary depiction is also used to describe the system and technique disclosed herein. FIG. 1 also depicts major components in the process area such as generators 140, transformer connections 150, circuit breaker or switches 160 and electrical loads 170. It must be understood that three process areas are shown herein for ease of explanation, but the system may have multiple such process areas.

Figure 2B:
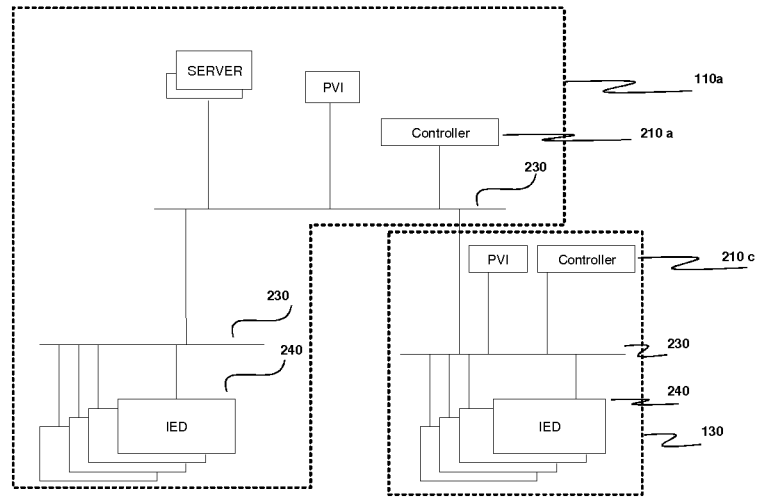
FIG. 2a and FIG. 2b are block diagram representations of power management systems as exemplary embodiments.
Figure 2A:
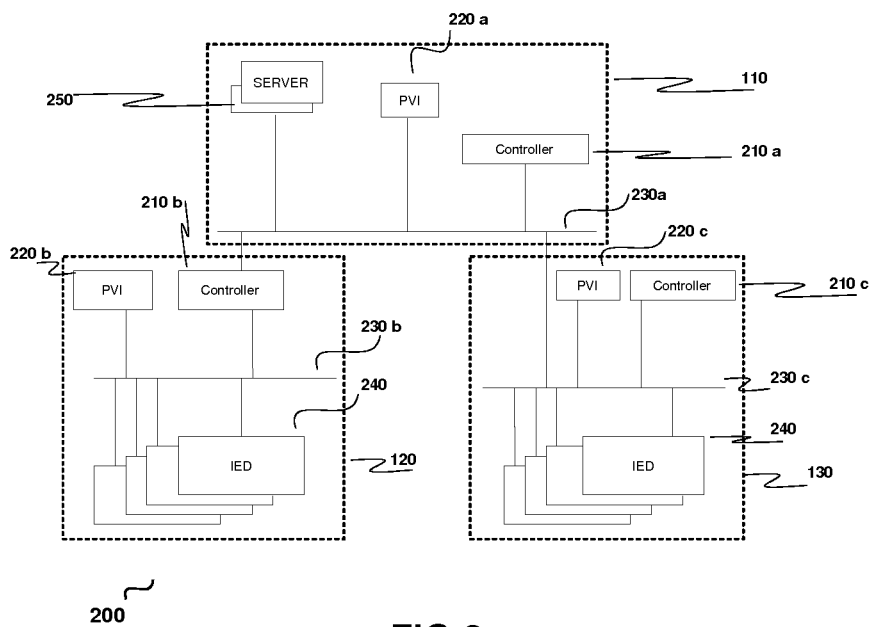

FIG. 2a and FIG. 2b illustrate exemplary implementations of the load shedding system as examples of a power management system for a particular functionality that includes both local load shedding aspects along with centralized load shedding. With reference to FIG. 2a, a load shedding system 200 includes more than one controller (210a, 210b, 210c) to control the plant electrical network. In an exemplary embodiment, at least one controller (210a) is configured as a Central Controller (CC) for plant level power management. The load shedding system 200 can also include a plant level process visualizing interface (PVI) 220a for plant process visualization that is connected to the Central Controller 210a. It may be noted that the Central Controller 210a, in the exemplary implementation is associated with the first local process area 110 associated with an upstream substation (local process areas also depict the associated substations and therefore a separate reference numeral for substations is not being used) connected with the main power generation sources and public grid connectivity. The association of the local process area with a controller and the scope of the local process area may be explicitly carried out as a definition in the controller configuration or inferred from the configuration files of the controller based on the substation equipment under control of the controller. FIG. 2b describes another exemplary implementation of the load shedding system to illustrate the Central Controller configured for a local process area 110a that includes an upstream substation and a downstream substation. It is to be noted that the local process area may be defined or configured to include multiple substations and alternatively a substation may include multiple local process areas.

The load shedding system 200 can also include several other Local Controllers (LCs), for example a second controller 210b, a third controller 210c and associated local PVI 220b, 220c for local process visualization. It may again be noted that each Local Controllers can be configured for controlling local process areas (120,130) in downstream substations. The Central and Local Controllers 210a, 210b, 210c are configured using a suitable Engineering and Configuration Tool for power management functions.

The process visualizing interfaces 220a, 220b, 220c are human machine interfaces (HMIs) that allow the operators/users at the process plants to view the key functions, and monitor, control and configure the substation activities. The HMI associated with the CC (e.g., the PVI 220a as described herein) displays the industrial plant wide load shedding function and a summary of the individual downstream substation load shedding function. Due to the presence of a local HMI (e.g., web based) module such as PVI (220b, 220c) along with the respective LC, the user can monitor and parameterize the downstream substation load shedding function from the substation itself and if desired, initiate actions to inhibit or block load shedding for individual loads.

The downstream substations in the local process areas 120, 130 are connected (electrically through transformers or tie lines) to the upstream substation associated with the first local process area 110 at, for example, a higher voltage level. The power generation, transformers and loads are distributed at both a downstream substation level and at the higher voltage level(s) at the upstream substation level. The connection to a downstream substation could also be from the adjacent substation or an external grid connection. Referring again to FIG. 2a, the load shedding system 200 also depicts the network connectivity through a plant-wide communication network 230 (LAN) connecting the various substation automation devices in a suitable manner (e.g. 230a, 230b, 230c). The controller 210b is depicted to be connected to LAN 230a and 230b, different in the manner compared to the LAN connection of the controller 210c to illustrate the variety in practice of structuring distributed control systems. FIG. 2a therefore, is to be treated only as an exemplary embodiment. Further the load shedding system 200 also includes the downstream substation IED sets 240 and one or more servers 250 to support engineering, communication connectivity and to provide various plant level services connected with power management system. As will be understood to those skilled in the art, the downstream substations at local process areas 120, 130 may also include generation units, external grid connectivity, connectivity to other power networks, islanded electrical networks and local loads controlled by IEDs 240.

The plant level load shedding function information that includes for example but not limited to, the accumulated load information across different downstream substations, connectivity information about upstream to downstream substations electrical and communication connectivity, summated available power information from downstream and upstream substations etc., is processed by the Central Controller 210a and is available on the process visualizing interface 220a.

Similarly local load shedding function information processed by Local Controllers 210b, 210c which includes local load shedding information related to downstream substation, network configuration information, available power from power sources (generators and transformers connected to upstream substations/grids etc) and loads power consumption information per priority, is displayed on the process visualizing interface 220b and 220c.

The priority information can be process priority information for power management functions. For example, for load shedding functionality this priority is referred to as load priorities or load shedding priorities; for power control as preferred modes for a generator; for power restoration as reconnecting priority for a load, etc.

The load shedding priorities as used herein can refer to priorities for shedding different loads associated with the upstream and downstream substations based on their power consumption, functional criticality etc. Also, the load shedding priority is, for example, defined for a load or feeder that is to be shed/tripped during a system disturbance or fault (contingency).

In the exemplary embodiment, the priority definition is applied as a number (1 . . . 20 or 1 . . . 50 etc), depending on the importance of the load, for example '1' being assigned to the lowest priority load/feeder and '20' or '50' assigned to the most important ones in the plant. It may be noted here that the same load shedding priority can be assigned to one or more loads/feeders in a substation. Also, there could be one or more substations assigned to a LC. Hence, there could be the same priority numbers across different substations as well. However, for load shedding functionality by the LC at downstream substation level or CC at plant level, this appears as a single consolidated data (power consumption of a load) per priority. This implies that there is consolidated power value for each priority from 1 to 20 or 50 calculated at LC (at downstream substation level) or CC (at plant level overlooking at many downstream substations). Hence all the identical priority loads' data is summated and presented as a single 'lumped/consolidated' priority data for the CC from LCs.

In a more specific example, PVI at the plant level displays the following information:
  Plant wide electrical network summary for Load Shedding
  Plant wide load shedding status
  Communication status between CC and LCs
  Upstream power sources and outgoing feeders' (to downstream substations) data
  Downstream substation electrical connectivity status
  Downstream substation data including substation identity and electrical network status data (circuit breaker status, generator power information etc). Summated data for loads across various downstream substations, against every priority Similarly, in a more specific example, data displayed on PVI at the local process area includes:
  Downstream substation electrical network summary for Load Shedding
  Downstream substation summated data for loads against every priority
  Downstream substation power sources and outgoing feeders load shedding data
  Downstream substations not participating in load shedding
  Downstream substation network circuit breaker status along with network identity
  Downstream substation load shedding status
  Downstream substation power connectivity to upstream substation
  Downstream substation identity
  Downstream substation LC communication status with CC The communication support and data modeling (using IEC61850 Logical Node data modeling definitions) for plant level PVI with LC, CC and other Protection and Control IEDs can be performed using IEC61850 MMS profile. The LCs and CC can communicate using the IEC61850 GOOSE profile. The LCs and the Protection and Control IEDs in the downstream substations can communicate using the IEC61850 GOOSE profile. This communication and data modeling can ensure that all process data (information) uses IEC61850 communication profiles, without the need for any proprietary (vendor specific/non standard protocols) mode of communication.

According to exemplary aspects of the disclosed technique, the LC collects load shedding information, pertaining to its downstream substation, from the IEDs connected to different loads in that substation. It assimilates this information and then prepares a consolidated local load shedding information to be sent to the CC.

In the initial state the data, the CC receives downstream substation information. Exemplary data from the LC to CC includes:
  Downstream substation identification
  Downstream substation load shed functionality in "LC/CC" control
  Downstream substation feeders not participating in load shedding
  Downstream substation load shed functionality status
  Downstream substation electrical network information including power delivery capability information, actual power delivery, circuit breaker information, load data along with priorities.

The CC processes the information from both upstream and downstream substations and issues load shedding actions or priorities for LC (through IEC61850 Communication status and connectivity between upstream/downstream substations).

At the initial state the following are the examples of the data communication from CC to LC:
  Downstream substation number where load shedding needs to take place
  Load Shed priority command for all downstream substations (LCs) connected to CC
  Electrical connectivity status between upstream and downstream substations
  LC's operational status (operating in complete autonomous mode or in partial autonomous mode or complete remote control mode)

Under steady state, when a LC and CC are connected (upstream and downstream substations are connected or the communication network LC and CC are connected on the Plant-wide LAN on IEC61850), the downstream substation is 'unified' with the rest of the plant electrical network in the load shedding functionality. Here, the downstream substation load shedding functionality is in remote control mode, controlled by the CC (LC operates in conjunction with the CC).

The CC keeps a tab of downstream substations that are 'connected' to upstream substations and receives downstream substation's load shedding functionality information from respective LCs. The CC does a plant wide load shed calculation based on the information received. The plant wide power balance calculation is based on:

[Σpower from upstream power sources+Σ power from all downstream substation power sources]−[Σ load consumption from all downstream substation loads+Σ load consumption from upstream substation+Σ unavailable loads for LS in upstream substation+Σ unavailable loads for LS in downstream substations]

Under steady state, when the upstream and downstream substations are electrically disconnected or LC and CC are communication wise disconnected from each other, the downstream substation is 'disconnected' from the rest of the plant electrical network in the load shedding functionality.

Here, the downstream substation's load shedding functionality is in local control mode (autonomous mode), controlled by the LC.

If the local control mode is due to a power disconnection, the disconnected island(s) in the downstream substation ceases to participate in the plant wide load shedding functionality. The CC does plant wide power balance calculation for the rest of the network except the disconnected island(s) in the downstream substation (as it does not see any power flow into the isolated downstream substation). The LC does a downstream substation load shed calculation, that is, a downstream substation load shed power balance calculation based on:

[Σ power from the downstream substation's power sources]−[Σ load consumption from the downstream substation loads+Σ unavailable loads for LS in downstream substation]

If the local control mode is due to a communication failure, the disconnected island(s) in the downstream substation ceases to participate in the plant wide load shedding functionality. The downstream substation(s) cease to participate in the plant-wide LS functionality. The LC does not send any updated information to the CC (due to the communication failure). The CC senses this and discards 'old data' from the LC for plant-wide LS calculations. The LC also discards data from CC for its local LS calculation.

Figure 3:
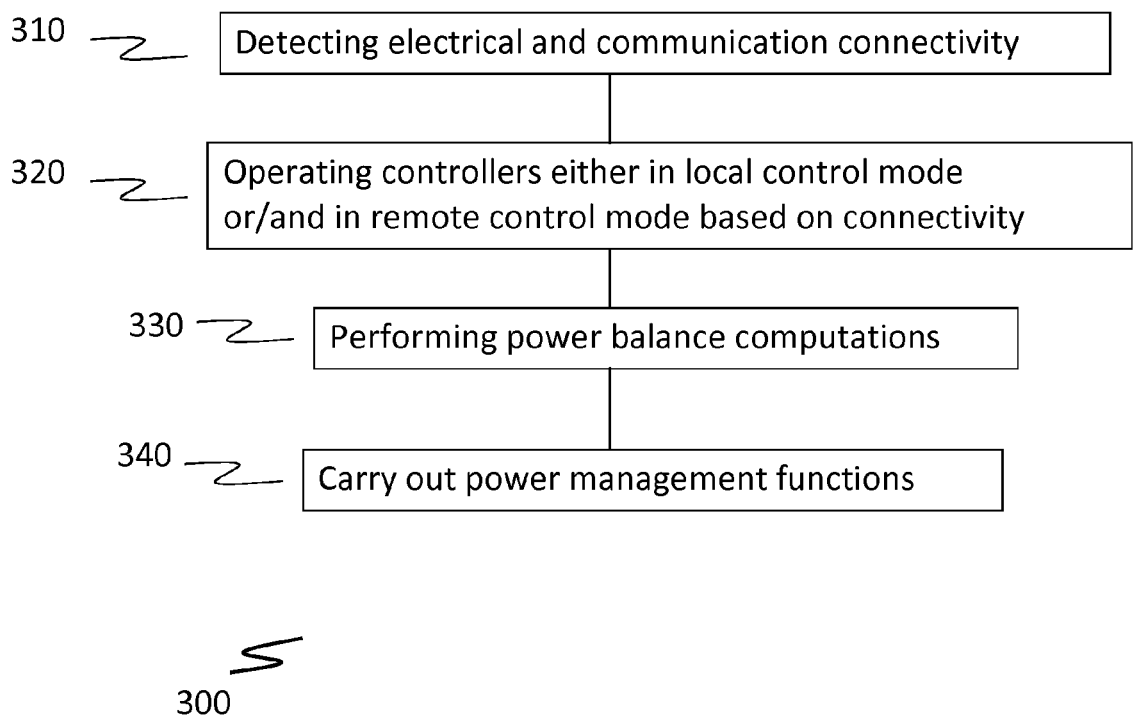
FIG. 3 is a flow chart representation of an exemplary method of power management in accordance with an exemplary aspect disclosed herein.

As exemplary aspect of a power management (load shedding being the exemplary but non-limiting power management functionality) method used by the system 200 of FIG. 2 is described through the flowchart 300 as shown in FIG. 3. As illustrated, at step 310, the controllers (CC and LCs) detect their electrical connectivity status through exchange of electrical network information related to their respective local process areas and communication connectivity status as a result of the communication process between the controllers. At step 320, based on the exchanged network data or/and the connectivity status, the controllers involved in the power management process decide if there is a desire for any one of the controllers to operate in remote control mode or in local control mode. The electrical information exchanged or maintained are either used for power balance computations (remote control mode) or discarded (local control mode) as illustrated in step 330. In local control mode, the power balance calculations at the individual controller are performed as if the electrical network under control of the other controller does not exist. If the electrical information is not to be discarded (remote control mode) then one controller (LC) operates under command of another controller (CC) that does centralized computation for the plant. It is to be noted that each controller (CC and LC) computes to maintain power balance and highest electrical power availability in their respective local process area. As is evident, for a controller the scope/extent definition for power management is dependent on the electrical and communication connectivity. It is re-emphasized here that a central controller (CC) has the entire plant electrical network as its scope for power management with an option of operating the entire or a part of the plant electrical network in conjunction with one or more additional controllers (local controllers).

Figure 4:
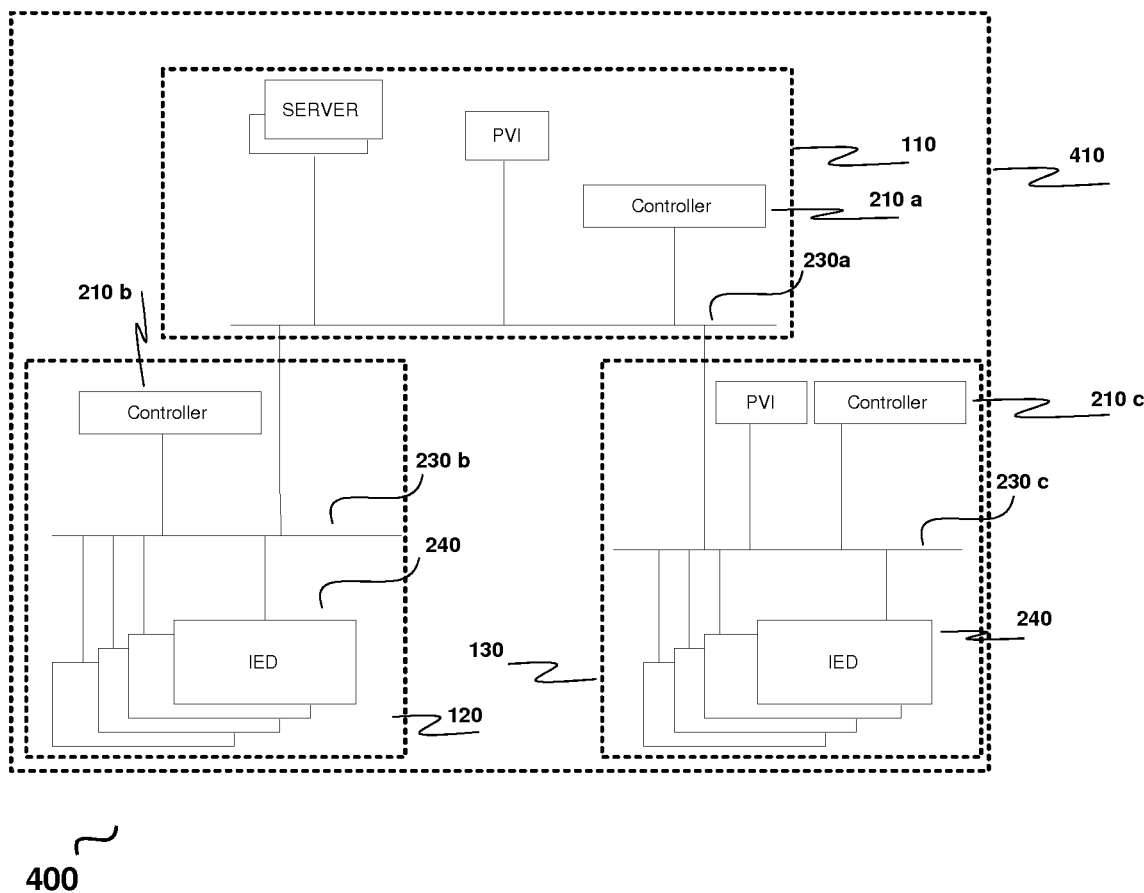
FIG. 4-FIG. 6 are block diagram representations of a power management system according to additional exemplary embodiments.

It may be noted that the local process area for the CC is depicted as that of the upstream substation (110) as in this area the CC is described to have direct control for power management. However, the CC (210a) has the entire electrical plant network as its scope for the local process area and performs indirect control for power management through one or more local controllers (210b, 210c) configured in their respective local process areas (120, 130). This aspect is illustrated in the system 400 depicted with FIG. 4. The local process area (410) for the CC is illustrated along with the local process area (110) that includes upstream substation. Here, only the local process area (110) including the upstream substation is under direct control of the CC (210a).

Figure 5:
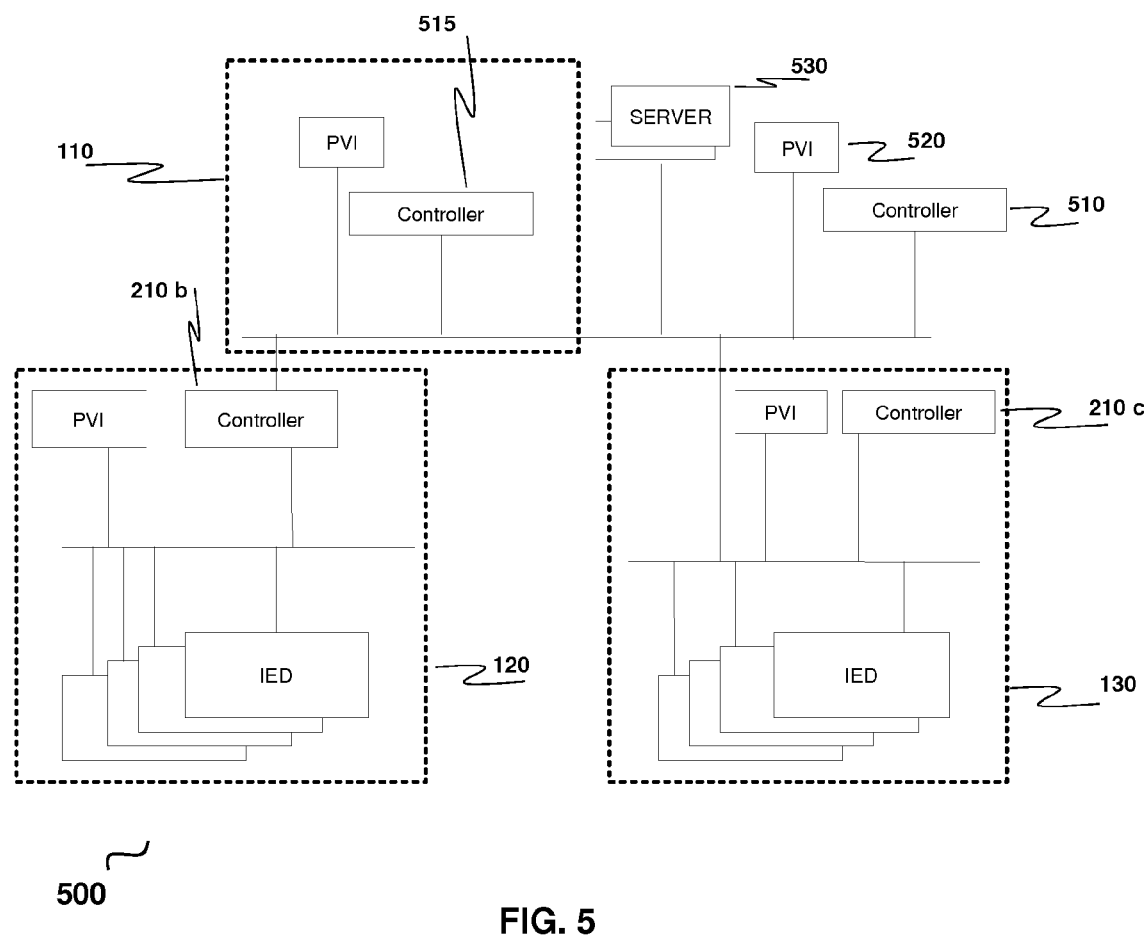

In FIG. 5, the exemplary CC (510) is depicted to function only as an independent CC with no direct control in any of the local process areas related to substations. The plant PVI (520) and the servers (530) for plant power management are also depicted outside the local process area of the local controllers (515, 210b and 210c). This exemplary illustration is made to highlight that the CC may perform power management for the plant electrical network through local controllers in various local process areas. It is again to be noted that the local process area for the CC is the entire plant electrical network.

Figure 6:
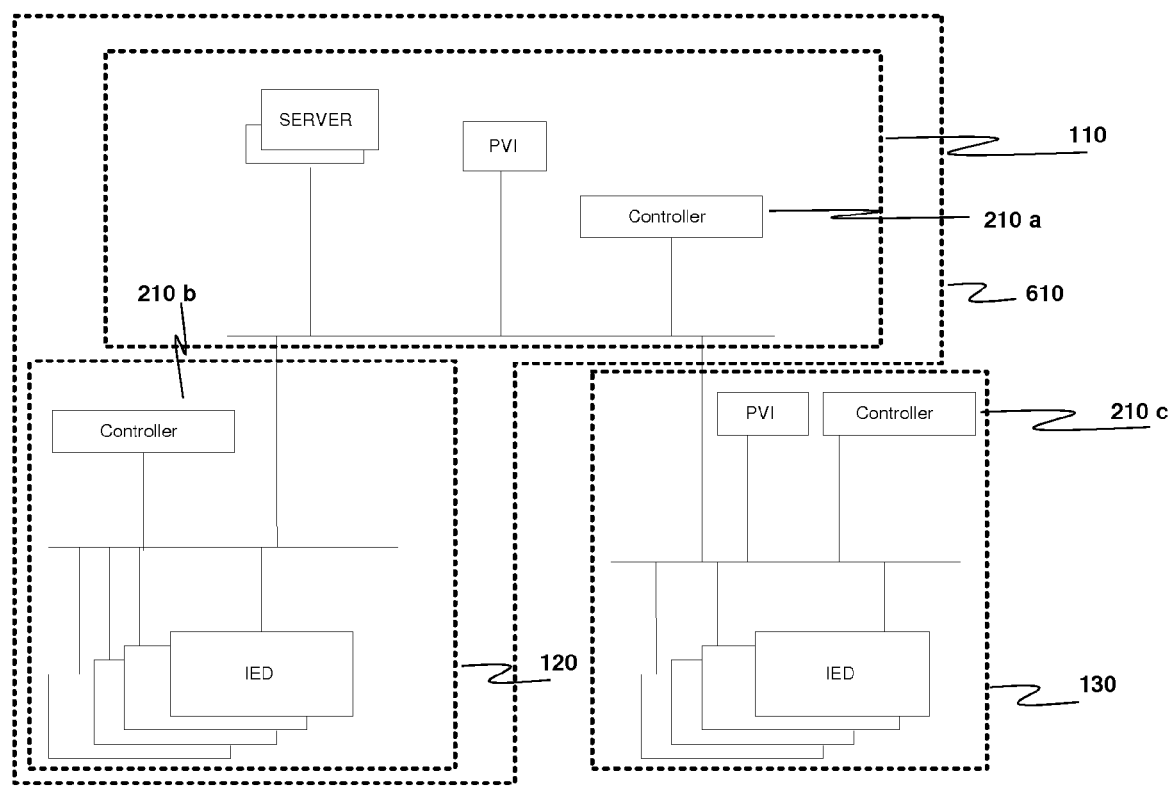

It is also to be recognized that though in normal conditions, the local process area for the CC is the entire plant electrical network, the CC can be programmed to exclude a particular part of the plant electrical network and the local process area for the CC may dynamic change based on various contingency conditions described through various examples above to exclude a portion of the plant electrical network that is isolated or islanded in the plant electrical network. This aspect is depicted through FIG. 6 which illustrates a different configuration of the local process area (610) for the CC than the local process area (410) covering the entire plant electrical network. This change may be intentional (CC configured or programmed to include only part of the plant electrical network as its local process area) or a result of dynamic activity (e.g. contingency condition) in the plant electrical network.

It will be appreciated by those skilled in the art that the LC transfers control to higher level CC only for the connected local load network configurations. However, in case there is a local island network (e.g., an unconnected island in the downstream substation), the information pertaining to the unconnected island information is discarded for plant-wide power balance calculations by the CC, and the LC handles the load shedding due to the unconnected island in the downstream substation.

In the exemplary embodiments as described herein each LC is therefore configured to carry out power management functions by issuing local commands (like load shedding trip command information) to address the load shedding priorities for one or more local islands in the local load network, where the local island exists due to an isolation of the local load network from the rest of the main power plant network. In other words, the LC takes over control for any load shedding requirements for local islands thus relieving the CC of these tasks. The LC is also configured for setting local load shedding parameters to address the local load shedding priorities in the local process areas.

The maximum number of power network islands that can be handled using the LC as described herein is conceptually limitless, as the CC only has to take care of the islands at the highest voltage level (e.g., plant level islands) and the LCs take care of the local substation islands. In case of formation of local substation islands, the respective LC acts independently without the need of any intervention from the CC. Thus, the reach and functionality coverage in the whole plant is substantially high as compared to the centralized functionality of known systems.

Further, in an exemplary implementation, each LC is configured to operate in an isolated or autonomous mode (local control mode) when the communication with CC fails or when there is a power disconnection from the upstream substation, but with an infeed of power from other sources like local GTG (Gas Turbine Generator)/STG (Steam Turbine Generator)/DG (Diesel Generator) set, or tie feeder connection from other substations) to the downstream substation. It is reiterated that the LC senses that it needs to go on an autonomous mode by checking the communication status of itself with the CC and also the power network connectivity between the plant level substation and downstream substation where it is located. Alternatively, it will also be possible for the user to take the LC into autonomous mode in case it is needed by using the local PVI.

According to exemplary aspects of present technique, the load shedding functions at each LC remains activated at all times to cater for local islanded network configurations. Additionally, the functionality to detect overloading of the incoming grid transformers also remains activated in the downstream substation level LCs. Therefore, the local controller is configured to operate at same time in remote control mode in conjunction with the central controller and also in autonomous mode for power management in one or more sections of electrical network associated with its local process area.

It is reiterated that the CC on its part is configured to treat the downstream substations like 'lumped loads' (consolidated priority wise) and CC performs power balance calculations at the overall system/plant level. On a system/plant level disturbance, the CC calculates the system/plant level power balance and issues plant wide or plant level load shedding priorities. These priorities would be received by the individual LCs and they in turn would shed the needed load/generator or shed the load/generator based on assigned priorities within the substation 'locally'. In other words, the LCs treat the priority information from CC like a local manual load shedding priority directly issued to it.

As would be clear from above description, the CC and LC can communicate with each other to address the load shedding needs of the overall process plant based on power balance principles.

Also, as is clear from the above description, the LC can handle the downstream substation load shedding data, and only a consolidated (summarized) electrical network data and available power and the consolidated load power consumption per priority is sent from the LC to the CC. Thus processing load of the system can be divided between the LC and CC. As a result of the LC taking care of the priorities within a downstream substation and the CC taking care of the consolidated priorities from the downstream substations, the load shedding priorities' processing load is substantially reduced in the CC resulting in high availability of CC and greater operational flexibility.

Also since the LCs are directly connected to the downstream substation IEDs, the communication loading on the CC is further reduced to a large extent. The CC need only communicate to the LCs. As all substation IEDs are connected to their respective LCs over IEC 61850 GOOSE for load shedding I/O data exchange and only the LCs are be connected to the CC, the LC does all the pre-processing of downstream substation LS data before transferring the consolidated LS data to the CC. Also in this manner, the LCs 'hide' the substation configuration and connectivity complexities from the CC, thereby improving and increasing availability levels of the CC.

Referring now to priorities handling at LC and CC, in one exemplary embodiment dynamic load shedding priority assignment is provided for loads/feeders, based on system operational conditions. The priority assignment in another example is done at overall industrial plant level, based on downstream substation priority or based on downstream process loads'/feeders' priority.

In the exemplary embodiment, common load priorities may be defined across the complete industrial plant, that is, between two or many substations, there can be common priorities and load shedding would result in all the substations with common priority on command from the CC. In this manner, the load shedding can be performed in a discrete manner until the lowest possible level in the downstream substation.

Alternately, in case loads need to be shed in some other downstream substations due a disturbance in one of the downstream substations, then load priorities can be defined, and these are generally referred herein as "pre-identified load priorities". Priorities can thus be tailored to maximize efficiency of the load shedding system. Each LC in one exemplary implementation may have a local priority assigned for its corresponding local process area at the CC and load shedding is done on the basis of such assignment. Having a priority assignment scheme according to operational conditions, results in functionality termed as 'Flexible Auto Update of Priorities' that is implemented in the LC in an exemplary embodiment.

As mentioned earlier, all substation IEDs communicate information needed for load shedding to their respective LC over OCS. The substation(s) LCs further communicate the local substation load shedding information to the CC, also using OCS. It may be noted that the LC does all the pre-processing based on power balance calculations of downstream substation data before transferring the consolidated prioritized data to the CC.

The exemplary aspects of the present technique can advantageously achieve "Fast Load Shedding", "Slow Load Shedding" and "Manual Load Shedding" modes as explained below, based on plant level and downstream load shedding functionalities. The "Fast Load Shedding" mode is activated based on trip of power sources or change of network 'defining' circuit breakers in upstream or downstream substations. Manual Load Shedding is based on issuing of local load shedding commands using a manually fed manual priority for local loads. Manual Load Shedding is based at both CC and LC levels. At the CC level, the user enters the load priority or the power information for necessary load shedding actions across the entire plant network including downstream substations, using the plant level PVI. If Manual LS is to be initiated at the LC level, the user enters the load priority or the power information or necessary load shedding actions in the downstream substation, using the local PVI. It may be noted that here that in known systems there is no information regarding load shedding function at the downstream substation due to a lack of HMI function at the downstream substation. Hence, the only way to know the load shedding status from the downstream substation in the known systems is from the HMI associated with the Central Controller. An exemplary method and system disclosed herein can overcome this limitation of the known systems and the user can monitor and parameter the downstream substation load shedding function from the substation itself.

An exemplary technique as disclosed also achieves "Slow Load Shedding" based on overload of a transformer connecting the downstream substation to the upstream substation. The Slow Load Shedding Mode can be especially advantageous in case of overloading (acting over a period of time, based on overload levels) on downstream transformers. In this situation the Slow Load Shedding Mode is activated and the LC sheds loads in the downstream substation. Thus, a swift correction of the transformer overload condition and load balancing in the downstream substation is achieved by the LC. Because of the presence of the Slow Load Shedding mode in the LC, a permissive overloading condition (for limited time duration) can be permitted on the downstream substation transformer, thereby avoiding the need to do load shedding. The permissive overloading condition is based on different parameters including but not limited to ambient temperature, status of outgoing feeders on the bus bar, etc. Thus, load shedding can be avoided in a situation where the downstream transformers can be 'overdriven' based on permissive (based on current loading levels and transformer capacity to get overloaded) overloading condition thereby increasing system availability.

Though the illustrations are made using the example of transformers, embodiments may find application in controlling load in any power equipment in the plant electrical network. The power equipment may be single equipment or a combination of individual equipment such as power transformer, voltage transformer, current transformer, generators, capacitor banks, motors, circuit breaker, switches, cable and connectors.

The interconnecting transformer between upstream and downstream substations potentially can be overloaded in both directions, towards the upstream substation (distributed generation in downstream substations) and downstream substations. The controller may allow such overloading temporarily, the time based on the amount of overload and such that slow load shedding results before the time set for the transformer protection breaker to operate. In the power management system 200, a comprehensive overload condition handling for grid and interconnecting transformers is provided by coordinated functions between the controllers.

The overload detection in an exemplary embodiment is based on the IDMT (inverse definite minimum time) mechanism, similar to the over-current protection principle is used in the system. Such mechanisms are also referred to herein as load-time characteristics of the power equipment. Some examples of transformer overload conditions and the system behaviour is illustrated using exemplary cases.

Case 1:

The interconnecting transformer between downstream substation and upstream substation gets overloaded, when feeding power from downstream to upstream substation.

The following steps are taken to handle and correct the overload situation in the interconnecting transformer:
1. The LC detects the overload condition and determines the amount of overload and direction of overload (upward direction).
2. The LC passes this information to the CC. This means that the LC does not initiate any load shedding actions to correct the overload condition.
3. The CC considers the overload condition as a plant wide load shed trigger. It treats the amount of overload on the transformer for power balance calculations, that is, it considers the overload amount as a power source 'shortfall' (in order to generate a load shedding action).
4. The CC issues a load shed command with priority information to downstream substations except to the downstream substation that detected the overload condition, to shed load(s) in their respective substation(s) equivalent to the overload on the downstream interconnecting transformer (between upstream substation and downstream substation having the overloaded interconnecting transformer). In terms of calculated power, the amount of loads to be shed would be equivalent to the overload on the interconnecting transformer. The load shed command is not issued to the downstream substation having the interconnecting transformer overloaded in the upward direction because the loads need to be shed in other local process areas other than the downstream substation that detected the overload condition in order to reduce or correct the overload situation of the interconnecting transformer.
5. Along with the load shed command and priority information, the CC would indicate to the LCs that the plant wide Slow load shed has been activated.
6. The controllers (LC/CC) belonging to the downstream substation and upstream substation would issue load shed commands to the identified loads through the respective IEDs, based on the calculated load shed priority computed/provided by the CC.

Thus the overload of a downstream substation interconnecting transformer, feeding power to upstream substation would result in LS action in other downstream substations (that draw power from the upstream substation). In the meanwhile, if fast load shed gets initiated from the CC and the LCs receives a shed priority, they perform the desired load shedding action including in the substation that has the overloaded interconnecting transformer.

Case 2:

The interconnecting transformer between downstream substation and upstream substation gets overloaded, when feeding power from upstream to downstream substation.
1. The LC detects the overload condition in the interconnecting transformer in the local process area and determines the amount of overload and direction of overload as well (downward direction).
2. The LC passes this information to the CC and does not initiate any load shedding actions to correct the overload condition in its local process area.
3. The CC considers the overload condition as a plant wide load shed trigger. It treats the amount of overload on the transformer for power balance calculations, that is, it considers the overload amount as a power source 'shortfall' (in order to generate a load shedding action).
4. The CC issues a load shed command with priority information to the LC having the overloaded interconnecting transformer to shed load(s) in its local process area equivalent to the overload on the downstream interconnecting transformer (between upstream substation and downstream substation). In terms of calculated power, the amount of loads to be shed would be equivalent to the overload on the interconnecting transformer. The load shed command is issued to only the LC that has the over loaded interconnecting transformer (overloaded in downward direction) is because loads need to be shed only in the substation connected with the overloaded interconnecting transformer to reduce or correct the overload situation of the interconnecting transformer. In a configuration where a single downstream substation contains multiple local process areas having multiple local controllers, the load shed command is issued to all the local controllers associated with the single downstream substation having the overloaded interconnecting transformer.
5. Along with the above information, the CC would indicate to the LC in the downstream substation that a plant wide Slow LS has been activated.
6. The LC in the downstream substation would issue load shed commands to the identified loads through the respective IEDs, based on the calculated load shed priority received from the CC.

Thus the overload on a downstream substation interconnecting transformer feeding power to upstream substation, would result in load shed action in that downstream substation itself. All the while, if Fast load shedding gets initiated, the LC in substations are ready to take the necessary steps to carry out load shedding.

Case 3:

The Public Utility grid transformer to upstream substation gets overloaded while feeding power into the upstream substation. This condition needs quick load shed action (in absence of Generator Power control feature in plants) as the Utility could impose huge commercial penalties on the process industry for exceeding the maximum demand (beyond the contractual level), even though the grid source though might be an infinite power source technically.

In some occasions, the Public Utility may experience overloads of the overhead transmission lines, in which case there is a danger of tripping and disconnection of the plant from the Grid. In such cases, there is a huge benefit of utilizing the Grid Overload functionality and to reduce the plant load to a safe limit and thereby preventing the overload of the transmission lines.

1. The controller (LC/CC) associated with the upstream substation detects the overload condition (based on maximum demand violation) and determines the amount of overload.
2. The upstream substation controller (if LC) passes this information to the CC. This again means that the upstream LC does not initiate any LS actions to correct the overload condition by itself. This step is ignored if the upstream substation controller is the CC itself.
3. The CC considers the overload condition as a plant wide load shed trigger. It treats the amount of overload on the grid transformer for power balance calculations, that is, it considers the overload amount as a power source 'shortfall' (in order to generate a load shed action).
4. The CC issues a load shed command with priority information to all downstream LCs to shed load(s) in their respective substations. In terms of calculated power, the amount of loads to be shed would be equivalent to the overload on the grid transformer. The downstream LCs are issued load shed command because loads need to be shed in downstream substations for better system availability and reduce grid transformer overload. Any load shed action in the upstream substation will result in load shed at the highest level, thereby cutting off power to downstream substations (resulting in bad process availability) and this is not preferred.
5. Along with the above information, the CC would indicate to all the downstream substation LCs that the plant wide Slow load shed has been activated.
6. The downstream substation LCs would issue load shed commands in their respective substations, to the identified loads through the respective IEDs, based on the calculated load shed priority received from the CC.

Thus the overload on a grid transformer, feeding power to upstream substation, would result in a plant-wide LS action (across all upstream and downstream substations).

A Public Grid Transformer is directly connected to upstream substation that is under the control of the corresponding LC/CC. In order to have a proper overload handling of the grid transformer, an IDMT characteristic coordination between the LC (if used for power management in the substation having the grid transformer) and CC needs to be carried out and the sequence of working is as follows:

1. The LC will initiate its IDMT function, when it detects the overload condition on the grid transformer in its local process area.
2. The LC also sends the power limit at overload condition (calculated or manually set, based on the system operating conditions) to the CC.
3. When the LC IDMT characteristic's calculated time is elapsed, the LC evaluates if there are enough sheddable loads under its jurisdiction (local process area) to correct the overload condition on the grid transformer (the sheddable load amounting to the overload needs to be less than the total sheddable load). If this condition is satisfied, the LC shall shed loads in its local process area.

Where the amount of overload is greater than the total sheddable load, the LC will send a load shed trigger information to the CC. Using this information, the CC will take appropriate actions across all the substations by issuing a common load shedding priority information to the LC.

If the grid transformer is in direct control of CC, CC shall carry out the additional tasks as defined for the LC in the above sequence. For example, it is to be noted that IDMT characteristics (including the power limit information) is available for the grid/interconnecting transformers in a local process area of any controller used in the system and coordinated slow load shedding is achieved as described above.

In the event of communication failure between the CC and LC either because of, for example, faulty CC or faulty network component (or any other reason), slow load shedding can be performed as provided in the two exemplary contingency cases described below.

Contingency Case 1:

The interconnecting transformer (between upstream substation and downstream substation) gets overloaded in the direction from downstream substation to upstream substation and as a result of communication failure between the CC and LC, plant wide load shedding functionality is unavailable.

The LCs will detect communication failure and switch themselves into local mode.

Since the overload situation is to be corrected in other substations (as in Case 1), the LC generates an alarm recommending the operator to use the LCs' Manual load shedding feature for disconnection of loads in the other substations. This will then reduce the load on the interconnecting transformer. Using the Manual load shedding feature, the user enters a priority or a power value until which loads need to be shed in downstream substations or upstream substation for the LC to carry out shedding of loads locally in those substations.

The LCs issues load shed commands to the identified loads through the respective IEDs, based on the manual LS priority value provided.

Contingency Case 2:

The interconnecting transformer (between upstream substation and downstream substation) gets overloaded in the direction from upstream substation to downstream substation and as a result of communication failure between the CC and LC, plant wide load shedding functionality is unavailable.

The LCs will detect communication failure and switch into local mode of operation.

Since the overload situation needs to be corrected in the same substation (as in Case 2), the LC having the overloaded transformer in its local process area detects the overload determines the amount of overload on the transformer generates an overload trigger performs power balance calculations The LC will calculate a load shed priority in order to remove the overload on the transformer.

Based on the calculated priority, the LC will issue load shed commands to the identified loads in the same substation through the respective IEDs.

Thus, the power management system having multiple controllers provides for a coordinated load shedding to handle transformer overload conditions in a plant. The communication between the various controllers is based on IEC61850-GOOSE to have fast response. Likewise, the Communication network between the LC and downstream substation IEDs also needs fast response times and therefore is based on IEC61850-GOOSE.

These three operation modes or functions, Fast Load Shedding, Slow Load Shedding and Manual Load Shedding are useful in power management for the process plant and ensure maximum operational availability of different equipment in the power network of both upstream and downstream substations and as one can find the control modes; specifically manual control may be exercised to provide contingency and automatic or manual control for normal conditions including manual overrides.

As would be appreciated by those skilled in the art, mainly the hierarchical concept of central and local load shedding is explained herewith as an exemplary embodiment. However, this hierarchical concept is not limited to load shedding function alone and may be extended to power management itself leading to greater efficiency and optimization of the power management systems deployed in various industries, utilities, and residential environments. Also, in the spirit of the invention, the correction for the overload condition may be extended to any power equipment in a local process area and the detection of the overload condition may be done directly through measurement or indirectly through computations by the controllers or the IEDs associated with the loads.

It is also stated that although the hierarchical concept is illustrated with two levels of hierarchy (e.g., one CC (first level) and LC (second level) connected in an hierarchical manner), the concept is extendable to have more than two levels of hierarchy (e.g., one CC (first level) in combination to one LC (second level) connected to one or more LC in sub levels (third level, fourth level and so on as per the need) where the electrical network data from sub level LCs are consolidated by the LC/CC hierarchically above the sub level LCs).

It would also be appreciated by those skilled in the art that though mostly the hierarchical concept of central and local load shedding is explained herewith as an exemplary embodiment, electrical network information exchange, computations related to power management functions and operation (control) are not limited to the controllers operating strictly in hierarchical manner. These may also result between any two controllers deployed to manage substations arising in architecture that are distributed or hybrid (distributed at same level and hierarchical with reference to a particular level).

While only certain features of the disclosure have been illustrated and described herein, many modifications and changes will occur by those skilled in the art. It is, therefore, to be understood that the appended claims are intended to cover all such modifications and changes as fall within the true spirit of the invention.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method for power management in a plant electrical network comprising one or more upstream and downstream substations, the one or more upstream and downstream substations comprising a plurality of power equipment, and wherein the power management is carried out using one or more local controllers and a central controller, the one or more local controllers and the central controller being configured for the power management in their respective local process areas within the plant electrical network, and wherein the one or more local controllers and the central controller are also configured for communication in a plant wide communication network, wherein the one or more local controllers and the central controller communicate with each other and with a plurality of intelligent electronic devices associated with respective power equipment of the plurality of power equipment, the method comprising:

receiving, at the central controller, load condition information which includes an amount of overload in at least one of the power equipment along with a direction of the overload, from at least one local controller among the one or more local controllers in the plant electrical network;

performing power balance computations, by the central controller, for plant wide power management considering the received load condition information;

issuing, by the central controller, a power management command along with a priority information based on the direction of the overload to the one or more local controllers in the plant wide communication network; and carrying out load shedding by the central controller or the one or more local controllers in their respective local process areas based on the power balance computations and the issued power management command.

2. The method for power management of claim 1, comprising:

providing the power management command for load shedding of loads in at least one local process area, other than the local process area containing the overloaded power equipment, when the direction of the overload is such that the overloaded power equipment is feeding power in a direction from the downstream substation to the upstream substation.

3. The method for power management of claim 1, comprising:

providing the power management command for load shedding of loads in the local process area containing the overloaded power equipment, when the direction of the overload is such that the overloaded power equipment is feeding power in a direction from the upstream substation to the downstream substation.

4. A method for load shedding in a plant electrical network having a plurality of controllers including a central controller configured for plant wide power management, the controllers being connected through a plant wide communication network, and the controllers being configured for power management in their respective local process areas in the plant electrical network, the method comprising:

detecting, by a first controller among the plurality of controllers, an overload condition in a power equipment and a direction of the overload in its respective first local process area, and consolidating the overload condition information along with the direction of the overload;

assessing, by the first controller, an ability to communicate the consolidated overload condition information in the plant wide communication network and electrical connectivity of the first local process area in the plant electrical network, to select an operation and control mode;

performing, by the first controller, based on the operation and control mode, a power balance computation to determine a priority information to control loading of the power equipment in the first local process area using the consolidated overload condition information for either load shedding in the first local process area or communicating the consolidated overload condition information for load shedding in the plant wide communication network to cause at least one local controller from the plurality of controllers in the plant electrical network to load shed in its respective local process area to control loading of the power equipment in the first local process area; and performing, by the first controller and/or by the at least one local controller in the plant electrical network, load shedding based on the priority information for load shedding to control load in the overloaded power equipment.

5. The method for load shedding of claim 4, wherein the first controller is configured as the central controller for plant wide power management.

6. The method for load shedding of claim 4, wherein the first controller is configured as a local controller in the plant electrical network.

7. The method for load shedding of claim 4, comprising:
selecting, by the first controller, the operation mode as a remote control mode when the first controller has an ability to communicate to the central controller and the overloaded power equipment in the first local process area has electrical connectivity with at least one local process area in the plant electrical network that is disjoint from the first local process area.

8. The method for slow load shedding of claim 7, comprising:
selecting, by the first controller, the operation mode as a completely autonomous mode either when the first controller is unable to communicate with the central controller, or when the first local process area does not have electrical connectivity with at least one local process area in the plant electrical network that is disjoint from the first local process area.

9. The method for load shedding of claim 7, comprising:
selecting, by the first controller, the operation mode as a partial autonomous mode when the first controller has an ability to communicate to the central controller, and when the at least one power equipment in the first local process area has electrical connectivity with at least one local process area that is disjoint from the first local process area.

10. The method for load shedding of claim 7, wherein the control mode is manual load shedding carried out in one or more local process areas, the load shedding being carried out by operators based on the priority information provided by the first controller or by the central controller.

11. The method for load shedding of claim 4, comprising:
managing the first controller and the central controller for slow load shedding based on load-time characteristics of overloaded power equipment.

12. The method for load shedding of claim 4, comprising:
performing slow load shedding concurrently with fast or manual load shedding.

13. A power management system for a plant electrical network comprising one or more upstream and downstream substations, the one or more upstream and downstream substations comprising a plurality of power equipment managed by a plurality of intelligent electronic devices, the system comprising:

a plurality of controllers for power management in the plant electrical network;

a plant-wide communication network connecting the plurality of controllers with each other and with the plurality of intelligent electronic devices associated with respective power equipment; and wherein a first controller from the plurality of controllers is configured for power management in a first local process area within the plant electrical network and is configured to communicate, over the plant-wide communication network, with at least a second controller from the plurality of controllers configured for power management in a second local process area within the plant electrical network, and for performing a power management function based on information communicated between the first controller and the second controller and based on a power balance computation carried out for a plant wide electrical network, wherein the first controller among the plurality of controllers is configured as a central controller for plant wide power management in the plant electrical network, and is communicatively connected to a totality of controllers among the plurality of controllers that are configured as local controllers for power management in respective local process areas within the plant electrical network, and wherein the information communicated between the central controller and a local controller of the totality of controllers includes load condition information of a power equipment located in the local process area of the central controller or of the local controller of the totality of controllers and wherein the said load condition information comprises of information about amount of overload and direction of the overload in the power equipment, wherein the load condition information is used to issue a power management command along with a priority information based on the direction of the overload in the plant-wide communication network to load shed in respective local process areas.

14. The power management system of claim 13, wherein the power management function includes slow load shedding to remove overload conditions in at least one power equipment in the plant electrical network.

15. The power management system of claim 13, wherein the power management function includes fast load shedding, slow load shedding, manual load shedding or combinations thereof carried out by the local controller either individually or concurrently with the central controller.

* * * * *